Dec. 13, 1938.                W. H. BAHAN                2,139,993
                        LOOM SWORD BEARING CLAMP
                    Filed Feb. 8, 1937        2 Sheets-Sheet 1
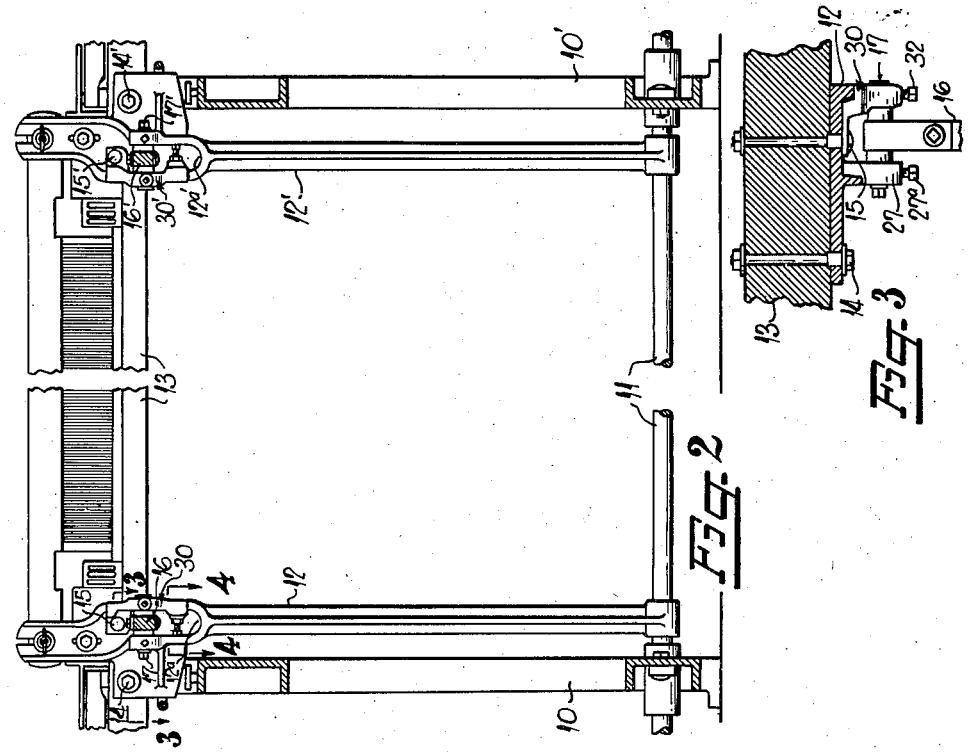
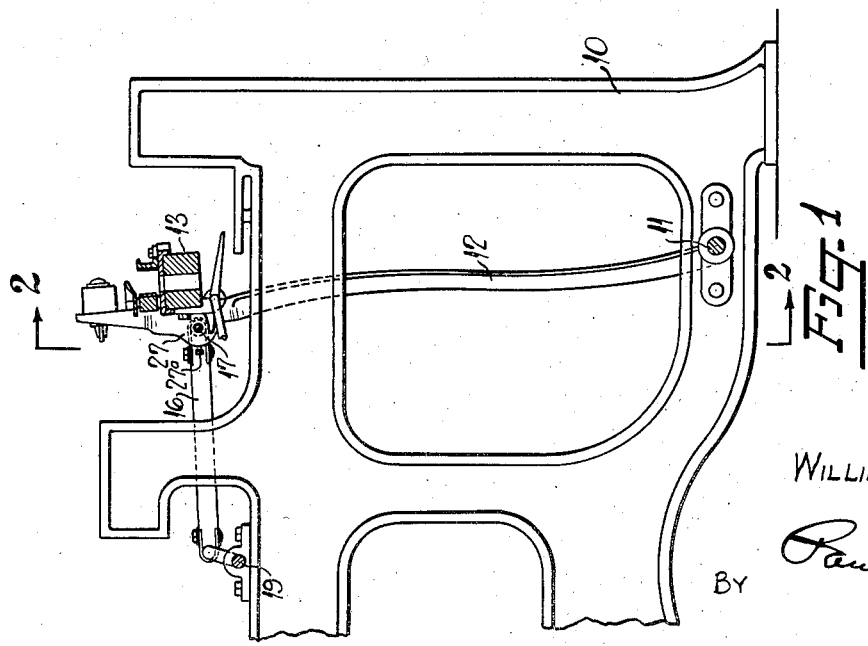
Inventor:
WILLIAM H. BAHAN Dec. 13, 1938.　　W. H. BAHAN　　2,139,993
LOOM SWORD BEARING CLAMP
Filed Feb. 8, 1937　　2 Sheets-Sheet 2

Inventor:
WILLIAM H. BAHAN
By Ranulf Eaton
Attorney

Patented Dec. 13, 1938

2,139,993

UNITED STATES PATENT OFFICE 2,139,993

LOOM SWORD BEARING CLAMP

William Henry Bahan, Greenville, S. C.

Application February 8, 1937, Serial No. 124,603

1 Claim. (Cl. 308—21)

This invention relates to a loom sword bearing clamp for use on the upper end of swords which support the lay of a loom. At the junction point of the pitman and the upper end of the sword an eccentric bolt penetrates a pair of spaced projections on the upper portion of the sword. Due to the fact that the size of the eccentric bolt at the point where it passes through one projection is considerably larger in diameter than its size where it penetrates the other projection a larger hole is provided in the first named projection in order to accommodate this bolt. Since the outside diameters or radii of both projections are essentially the same, it naturally follows that the projection with the larger hole therein will be subject to breakage much more readily than the projection with the smaller hole therein since the first projection has less metal surrounding the hole. When a projection breaks off of the upper end of the sword, it necessitates the discarding of the entire piece and substituting a new one, resulting in a great waste of material.

I have devised a clamp or patch which can be substituted for a portion of the projection which is broken away to thereby clamp one end of the bolt in position just as well as if the projection had not been broken.

It is therefore, an object of this invention to provide a patch or a clamp for supporting one side of the pitman pivot bolt of a lay sword with means for detachably securing the same in its proper position relative to said bolt to cause the bolt to be properly clamped in position.

It is another object of this invention to provide an improved loom sword in which a detachable bearing is secured thereto, so that in case of breakage a new bearing may be substituted.

Some of the objects of the invention having been stated, other objects will appear as the description proceeds when taken in connection with the accompanying drawings, in which:—

Figure 1 is a side elevation of the portion of a loom with portions thereof shown in section, showing the point of application of my invention;

Figure 2 is a sectional view taken along line 2—2 in Figure 1;

Figure 3 is a sectional plan view taken along line 3—3 in Figure 2;

Figure 5:
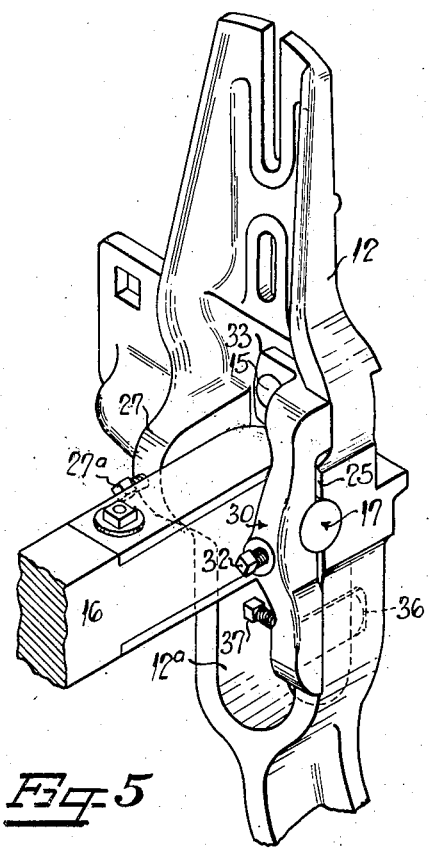
Figure 5 is an isometric view of the junction point of the upper end of the lay sword and the pitman.

Referring more specifically to the drawings, the numerals 10 and 10' denote suitable side frames of a loom which have mounted for oscillation in the lower portion thereof a rocker shaft 11, to which is fixedly secured swords 12 and 12'. The upper ends of these swords have secured thereto a lay 13 by any suitable means such as bolts 14, 14', 15 and 15'. These swords are identical in all respects except that they are opposite hand and a description of one will be made and like reference characters will be applied to the other with prime notations added.

The lay 13 is caused to oscillate about the rocker shaft 11 by means of pitmans 16 and 16' which are connected to the upper end of the swords 12 and 12' as at 17 and 17'. The other ends of these pitmans are secured to crank shaft 19, which, in turn, has it ends rotatably mounted between the side frames 10 and 10'. As the crank shaft 19 rotates it is evident that the lay 13 will be caused to oscillate back and forth. The pivot point 17, at which the pitman 16 is secured to the upper end of sword 12, comprises an eccentric bolt which has an enlarged bearing portion 20, an eccentric portion 21 around which the end of the pitman is adapted to fit, and a smaller bearing portion 22 which is adapted to be secured in the upper end of the sword. The portion 20 is adapted to fit in semi-circular hole 24 of broken-off projection 25, and the portion 22 is adapted to fit into hole 26 of projection 27. When this bolt is in position the eccentric portion 21 will be disposed between the lugs 25 and 27 thereby allowing the bolt to be turned to the desired position in order to effect an adjustment of the length of the pitman. When the conventional swords 12 are cast the projection 25 is similar to projection 27 except the hole 24 therein is considerably larger than the hole 26 in projection 27.

Figure 6:
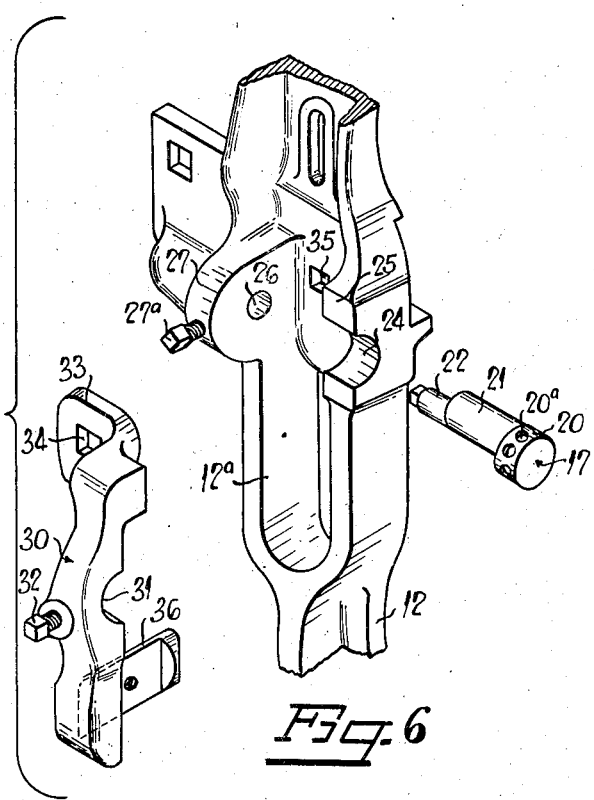
Figure 6 is an exploded isometric view of the parts at the junction point of the pitman and the lay sword.
Figure 7:
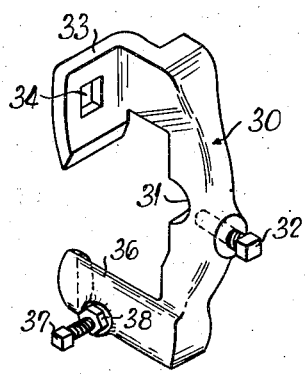
Figure 7 is an isometric view of the clamp.

As previously stated, due to the fact that the outside radii of the projections 25 and 27 are essentially the same and the hole 24 is larger than hole 26, it follows that the projection 25, which has the larger hole therein, will break more readily than the projection 27. When this projection is broken off in a manner shown in Figure 6, the entire sword is useless. In order to provide a convenient substitute of the broken-off portion of lug 25, a patch or clamp 30 has been provided which has a semi-circular bearing portion 31 which is adapted to fit over the enlarged head portion 20 of the eccentric bolt 17.

In case the break in projection 25 should not be smooth, it can be filed or ground to a smooth surface. A set screw 32 is provided in the member 30, the projecting end being adapted to fit into suitable cavities 20a in the portion 20 to hold the eccentric bolts in the desired position. This screw cooperates with set screw 27a in lug 27 whose end is adapted to contact bearing portion 22 of bolt 17 when the parts are in operative position.

Figure 4:
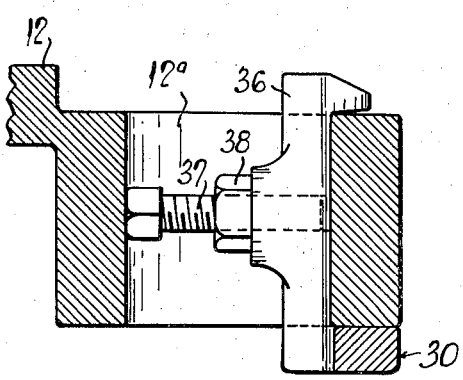
Figure 4 is a sectional plan view taken along line 4—4 in Figure 2.

The upper portion of the patch 30 has a laterally projecting flange 33 with a hole 34 therein, said hole being adapted to coincide with hole 35 in the upper portion of sword 12. The bolt 15 is adapted to penetrate the holes 34 and 35 as well as the lay 13 to properly clamp the parts in position. The lower end of member 30 has a rearwardly projecting hook portion 36 which is adapted to fit against the interior surface of Y-shaped portion 12a on the upper end of sword 12. When the lower end of member 30 is placed substantially in the position shown in Figures 4 and 5, a set screw 37 is screwed home in order to force the lower portion 36 against the interior surface of Y-shaped portion 12a. This is possible because the set screw 37 is threadably secured in the portion 36 and has the head thereof normally contacting one of the proximate interior surfaces of portion 12a thereby forcing portion 36 against the other surface. A lock nut 38 is provided in order to hold the set screw 37 in the desired position.

It is, therefore, seen that I have provided a substitute for a broken bearing on a loom sword which can be easily replaced and adjusted to proper position so that the pivot junction point of the sword and the pitman will be amply supported.

In the drawings and specification there has been set forth a preferred embodiment of the invention, and although specific terms are employed, they are used in a generic sense only, and not for purposes of limitation, the scope of the invention being set forth in the appended claim.

I claim:

In a casting having a rib provided with a transverse hole, the outer wall of which has been broken away, a repair device for replacing the broken away portion comprising a substantially U-shaped member having a semi-circular bearing portion adapted to fit over the broken-away part surrounding said transverse hold, and having one leg provided with a lateral projection adapted to fit behind the casting and having a second lateral projection on its other end provided with a hole, and a bolt penetrating said hole and said casting to confine the U-shaped member on the casting in the position specified.

WILLIAM HENRY BAHAN.